(No Model.)

J. B. FITZPATRICK & A. LEWIS.
GARDEN RAKE.

No. 332,885. Patented Dec. 22, 1885.

WITNESSES:
Ben F. Boyden.
John E. Morris.

INVENTORS:
J. B. Fitzpatrick
Alva Lewis
By Chas. B. Mann
Attorney.

UNITED STATES PATENT OFFICE.

JAMES B. FITZPATRICK, OF ST. ALBANS, AND ALVA LEWIS, OF WHEELING, WEST VIRGINIA.

GARDEN-RAKE.

SPECIFICATION forming part of Letters Patent No. 332,885, dated December 22, 1885.

Application filed May 15, 1885. Serial No. 165,577. (No model.)

*To all whom it may concern:*

Be it known that we, JAMES B. FITZPATRICK and ALVA LEWIS, citizens of the United States, residing, respectively, at St. Albans and Wheeling, in the counties of Kanawha and Ohio, and State of West Virginia, have invented certain new and useful Improvements in Garden-Rakes, of which the following is a specification.

Our invention relates to an improved garden-rake which has the handle pivoted to the head, and certain means for adjusting the head or holding it when turned on its pivot.

Figure 1:
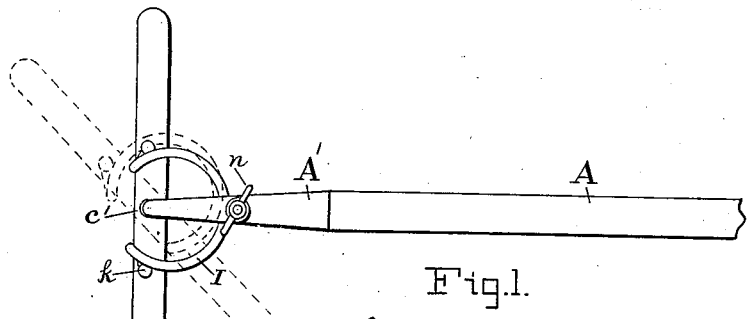
Figure 2:
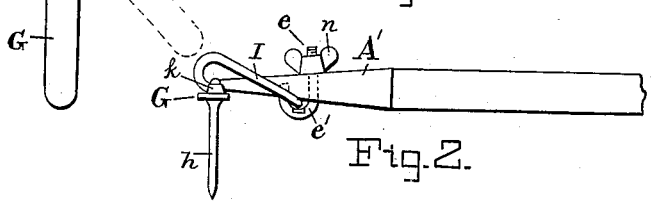
Figure 3:
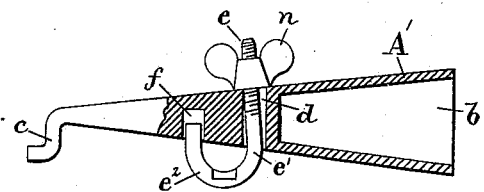
Figure 4:
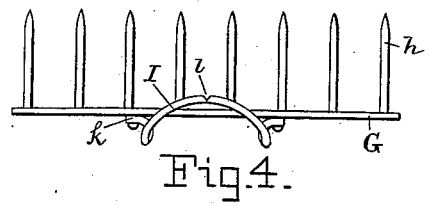
Figure 5:
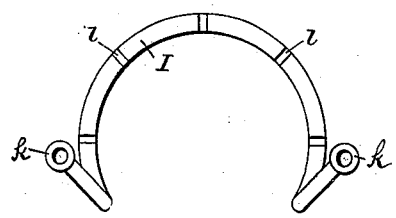

The invention is illustrated in the accompanying drawings, in which Figure 1 is a top view of the rake. Fig. 2 is a side view. Fig. 3 is a view of the iron which embraces the pivot, set-screw hook, and handle-socket. Fig. 4 is a view of the rake-head detached. Fig. 5 is a bottom side view of the adjusting segment-ring.

The letter A designates the handle; A', the iron provided with the socket $b$ for the end of the handle and with the hook-shaped pivot $c$. This iron has a hole, $d$, through which passes the screw part $e$ of the set-screw hook $e'$, and it also has a socket, $f$, for the end $e^2$ of the hook. The rake-head embraces the bar G, to which the teeth $h$ are attached. A pivot-hole, $c'$, is in the center of the head, and a segment-ring, I, has one of its two ends, $k$, attached each side of the pivot-hole. At the under side this segment-ring has notches $l$. The hook-shaped pivot $c$ on the end of the handle enters from the top down through the pivot-hole $c'$ in the head, and the set-screw hook $e'$ is lowered until the hook end $e^2$ is released from the socket $f$. Then said hook takes around the segment-ring I, and the hook end again enters the socket, whereupon by turning the thumb-nut $n$ the hook $e'$ will be tightened on the segment-ring, and by entering one of the notches $l$ on said ring will clamp and hold it firmly.

It will be seen that when it is desired to turn the rake-head with respect to the handle A the segment-ring I must be moved in the hook, to permit which the hook must first be lowered by turning back the thumb-nut.

The various adjustments which the rake-head is capable of adapt the tool, as will be readily understood, to do a wide range of work in the garden.

Having described our invention, we claim and desire to secure by Letters Patent of the United States—

1. A rake having in combination a handle provided with a set-screw hook and a pivot-hook, and a rake-head having a pivot-hole and a segment-ring which is clamped by the set-screw hook, as set forth.

2. A rake having in combination a handle provided with a set-screw hook and a pivot-hook, and a rake-head having a pivot-hole and a segment-ring provided with notches $l$, as set forth.

3. A rake having in combination a handle provided with a hole, $d$, a socket, $f$, and a pivot-hook, a set-screw hook having its screw part in the hole and its hook end in the socket, and a rake-head having a pivot-hole and a segment-ring which is clamped by the set-screw hook, as set forth.

In testimony whereof we affix our signatures in presence of four witnesses.

JAMES B. FITZPATRICK.
ALVA LEWIS.

Witnesses:
M. L. CALVERT,
J. M. KOONTZ,
CHAS. H. SORG,
J. H. CONNELLY.